Figure 1:
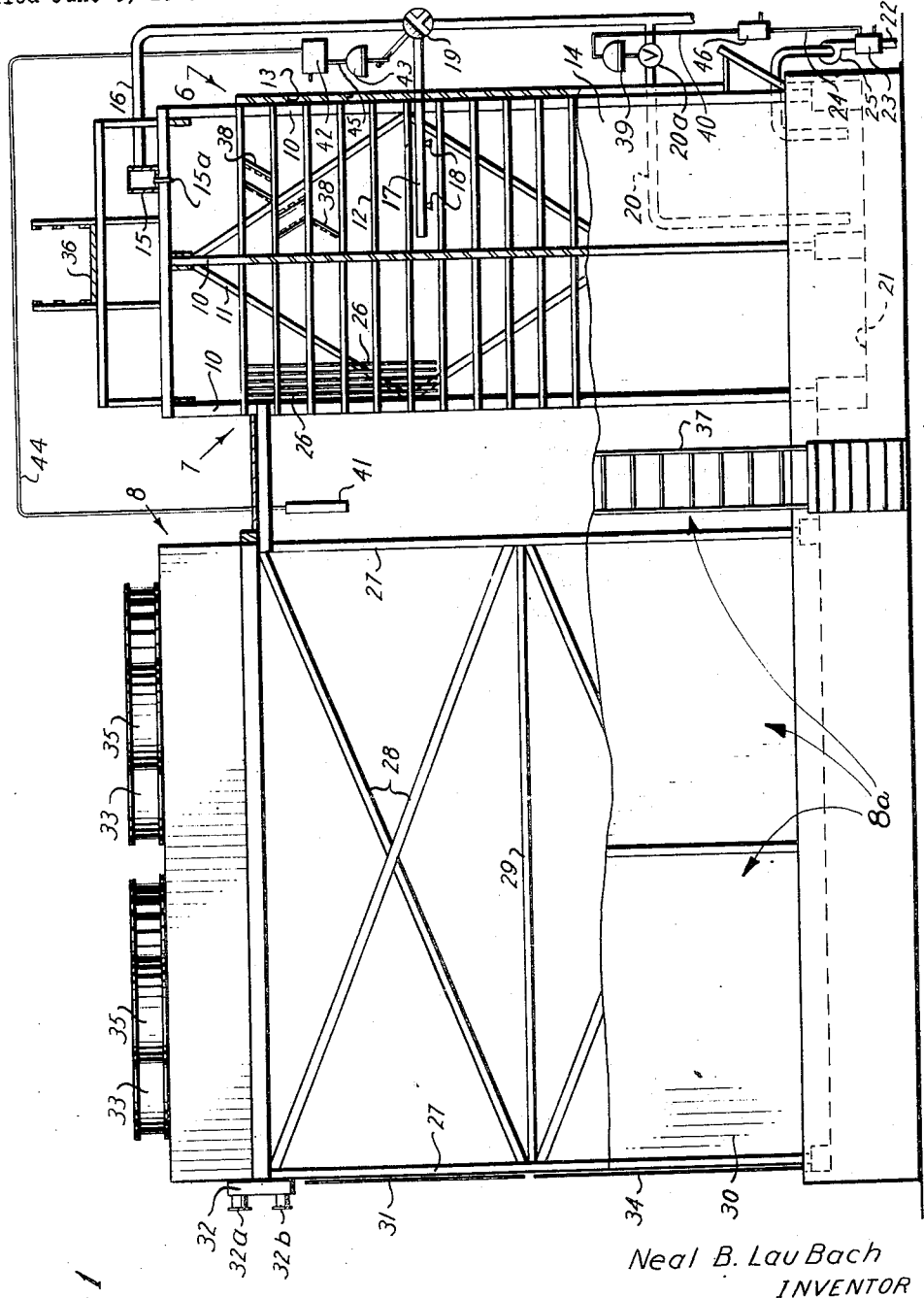

Neal B. LauBach
INVENTOR

ATTORNEYS

Patented Mar. 20, 1951

2,545,926

UNITED STATES PATENT OFFICE 2,545,926

AIR AND LIQUID COOLING APPARATUS AND METHOD

Neal B. Lau Bach, Houston, Tex., assignor to Hudson Engineering Corporation, Houston, Tex., a corporation of Texas Application June 6, 1949, Serial No. 97,371

16 Claims. (Cl. 62—139)

This invention relates to cooling systems and method of providing the cooling requirements for plants and refers more particularly to a system and method especially adapted for use in areas where good water is scarce.

Where good water is plentiful, cooling systems employing water solely as the cooling medium, wherein the hot water from a cooling operation is circulated through cooling towers to prepare it for reuse in the system, represents the cheapest installation from the standpoint of initial investment. However, in many arid or semi-arid locations, water is either so scarce or its mineral content so high, or both, that its use as the exclusive cooling medium is impractical from an economic standpoint. Usually, in such areas the ambient air temperatures, throughout a substantial portion of each year, are so high that it is impractical to use air cooling to supply the total cooling requirements of a commercial plant such as a gasoline plant or the like. In addition, in all plants there are certain cooling requirements which do not lend themselves to air cooling even were the ambient air temperatures sufficiently low to permit cooling to the desired extent. Such cooling requirements are, for example, for the jackets on compressors, glands for centrifugal pumps and the like where it is necessary to circulate water as the cooling medium.

In areas of scarcity of good water, it has been proposed to cool plant products, intermediate products and the like in a two-step operation wherein air heat exchange coolers are employed to reduce the temperature of the material to be cooled and the final cooling of the material is accomplished by the use of water as the cooling medium. However, this system and method require two separate installations which materially add to the investment in apparatus and still requires such a large amount of water for the secondary cooling as to constitute a real water problem.

An object of this invention is to provide a cooling system and method wherein a minimum quantity of water is required.

Another object is to provide a cooling system and method wherein only sufficient water to meet the equipment requirements and the like of a plant need be employed and yet the cooling requirements of the plant are adequately provided for.

A further object is to provide a cooling system and method of cooling wherein the cooling of the required water for the plant refrigerates a secondary cooling medium which may be used for supplying the remaining cooling requirements of a plant.

Still another object is to provide apparatus and method for meeting the cooling requirements of a plant where the air discharged from a water cooling tower, employed to cool the lowest water requirement of the plant, is used as a secondary cooling medium to provide the remainder of the plant's cooling requirement.

A still further object is to provide a cooling system for a plant which is capable of varied operations to meet the changes in cooling requirements of the plant due to changes in season.

Yet another object is to provide a single cooling tower construction arranged to provide for both water and product cooling wherein the cooling of the water provides a cooled air medium for supplying most of the cooling requirements of the plant.

Yet a further object is to provide a method of supplying the cooling requirements of a plant, the method being especially adapted for use in areas where good water is scarce and the ambient air temperatures undergo extreme seasonal changes.

Other and further objects of the invention will appear from the description.

Figure 2:
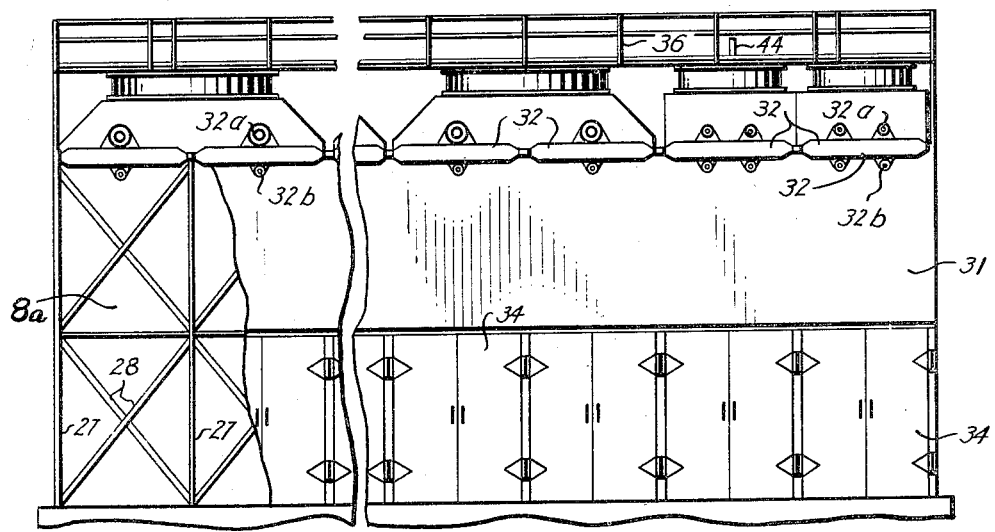
Figure 3:
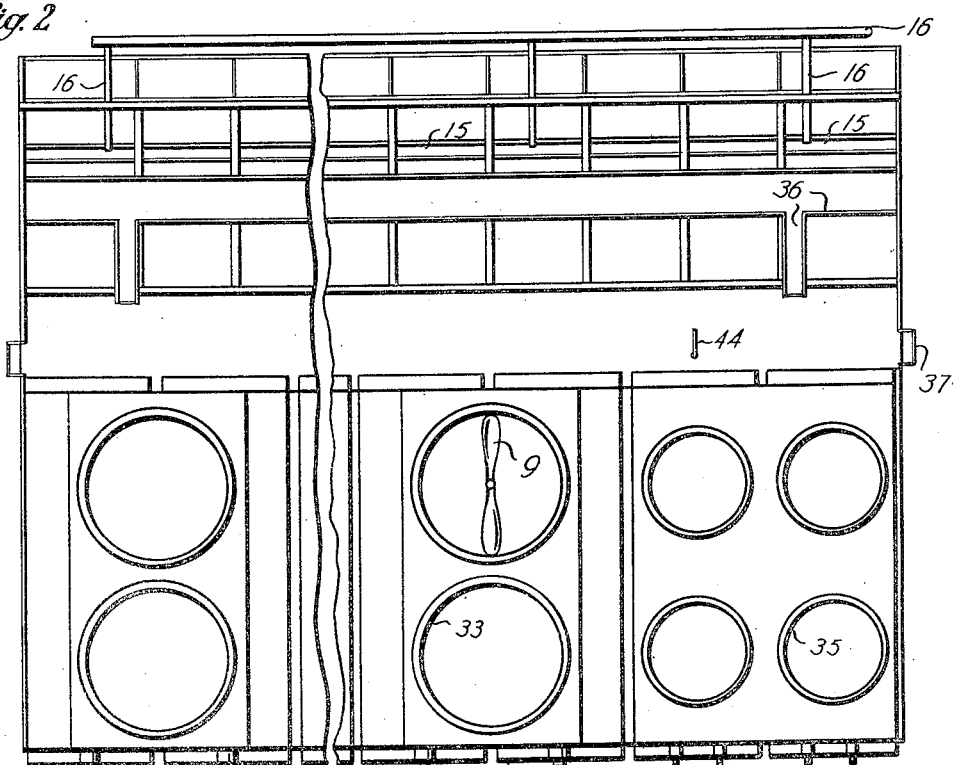

In the accompanying drawings which form a part of the instant specification, are to be read in conjunction therewith and wherein like reference numerals designate like parts in the various views:

Fig. 1 is an end elevation, with parts broken away for clarity, of a cooling system constituting an embodiment of this invention, Fig. 2 is a side elevational view, with parts broken away, of the cooling system shown in Fig. 1, and Fig. 3 is a top plan view of the cooling system shown in the other two figures.

Referring to the drawings, the cooling system can be considered as a tower framework having a water cooling section shown generally at 6, a mist eliminator section shown at 7, and an air heat exchange cooler section illustrated generally at 8. In the water cooler section 6, the water to be cooled is fed downwardly transversely to the flow of air through the section 6 whereby both the air and the water are cooled. The mist eliminator section 7 separates the mist from the air discharged from section 6. A duct means 8a, provided by the interior of the framework, connects section 8 with the water cooler and mist eliminator sections so that the cooled air from the mist eliminator is forced through air heat exchange coolers. A power means including fans 9, shown in Fig. 3, is provided to create a draft through the tower and a suitable means is provided for actuating the fans in such fashion as to provide for the draft in either direction.

Referring to the structure of the cooling system in detail, the water cooler section 6 comprises an upright framework which preferably is built in conjunction with the mist eliminator section 7. The water cooling section may be built in accordance with customary and usual practice for forced draft or induced draft cooling towers. As shown in the drawings, the section includes a plurality of vertical support members 10 with suitable diagonal braces 11 adding support thereto. These structural support members constitute a part of the tower framework and have mounted thereon a plurality of horizontal supports 12 adapted to receive any suitable water filming and breaking packer elements indicated at 38. The section 6 has an elongate open side provided with louvers 13. This opening extends the entire length of one side of the elongate tower structure and both ends of the section are enclosed with plywood or other suitable wall coverings as shown at 14.

A means is provided for distributing water downwardly through the cooler section including a trough 15 which extends longitudinally of the section 6. This trough has a plurality of jets or openings 15a arranged along its bottom portion adapted to spray water downwardly from the trough over the packer elements 38. Water may be supplied to the interior of trough 15 by a suitable conduit 16 or manifold having a plurality of branch lines leading to the interior of the trough.

In order to facilitate the control of the temperature of the water at the bottom of the tower, relative to the amount of air required to be passed through the tower, it is desirable to provide additional water distributing means as shown by the distributor head 17 having suitable spray head outlets 18. Distributor head 17 is connected to conduit 16 through a three-way valve 19 whereby water may be selectively introduced into the tower at an intermediate level. The arrangement is such that all the water can be introduced into the tower through either the trough 15, distributor head 17 or through both of the distributor means simultaneously in any given ratio as to the volume supplied by each means.

Section 6 of the tower is constructed to give adequate cooling capacity during operational periods requiring the greatest cooling capacity as, for instance, during full operation in the hot seasons of the year. The distributor means 17 makes it possible to vary the cooling capacity of the water section 6 for more moderate operation, and a means is provided in the form of a by-pass conduit 20 to further modify the operation of section 6 during the colder seasons of the year. Pipe 20 also connects with conduit 16 and is controlled by a valve 20a. It is desirable to have this valve 20a constitute a part of a temperature sensitive means adapted to act in response to the temperature of the water discharged from sump 21 of the tower through water discharge line 22. This may be accomplished by providing line 22 with suitable thermometer or thermocouple means 23, connected to valve 20a by conductors 24, pilot control box 46 and motor 39 all illustrated schematically. The arrangement is such that a pilot pressure is supplied to motor 39 through conduit 40 whose magnitude is a function of the temperature of the water discharged through line 22 to open or close valve 20a. The pilot control box 46 and diaphragm motor 39 may all be conventional equipment of this type well known to those skilled in the art. With this arrangement, as the temperature of the water discharged through line 22, under the influence of pump 25, decreases, valve 20a will open to bypass a portion of the water to be cooled directly into sump 21 through conduit 20. On the other hand, as the temperature of the discharged water through pipe 22 increases, the valve 20a will throttle down and when the temperature of the water passing through conduit 22 rises past the desired low temperature for the cooled water, valve 20a will close entirely.

A control means is preferably provided for regulating the valve 19 in response to the temperature of the air as it leaves the mist eliminator section 7. This includes a temperature sensitive device 41, disposed in the air passage within the duct 8a between the mist eliminator section 7 and the air heat exchange cooling section 8, a control box 42, and a motor 43 operatively connected to valve 19. The device 41 may be a thermometer or thermocouple and is connected by line 44 to box 42 to provide a pilot pressure supplied by line 45 to motor 43. With this arrangement, when the temperature of the air at device 41 is greater than a selected value, dependent upon the requirements of the air heat exchangers, water will be distributed through device 15a to the upper portion of the tower. When the air temperature is less than a selected value, the water will be distributed through spray heads 18 to an intermediate level in the water cooler. This control minimizes the water loss by evaporation and still assures proper air temperatures.

The control system just described is shown schematically, but may consist of conventional commercially available elements. The line 44 ordinarily will be secured to the tower frame work but is shown as extending thereabove for purposes of clarity.

This control system in effect provides for the regulation of the amount of air passed through the water in cooling it in response to the temperature of the air discharged from the water cooling step.

The mist eliminator section 7 may be constructed in accordance with any conventional practice, and it is believed that it does not require additional explanation other than to point out that the section is filled with a plurality of eliminator elements 26 adapted to provide a tortuous path for the mist laden air discharged from the section 6. The mist droplets impinge against elements 26 and drain into sump 21.

The air heat exchangers may also be supported on the same tower framework and this is desirable in the interest of economy of structure. This section 8 of the system includes a plurality of upright support members 27 suitably braced by diagonal supports 28 and horizontal supports 29. The two end walls 30 and the side wall 31 of section 8 are enclosed with suitable wall material to provide a duct means for conducting the air discharged from eliminator section 7 through the air heat exchangers 32.

The air heat exchangers 32 are supported by the upright tower framework and provide outlet openings for the air passing through the system.

These exchangers are shown schematically in elevation for they may be constructed in any conventional manner as will be well understood by those skilled in the art. The product input through exchangers 32 may be through inlets 32a and the cooled material is taken from the exchangers through fittings 32b. Mounted above the air heat exchangers are a plurality of fan rings 33 in which fans 9 may be mounted.

The wall 31 preferably is formed with a plurality of hingedly mounted doors 34 which may be moved into and out of closed position. By this arrangement of movable closures 34, a means is provided for bypassing air into the duct between the cooling sections 6 and 8 so that a portion of the air will bypass the water cooling section 6 as will be desirable in periods of cold ambient air temperatures.

By reference to Fig. 3, it will be noted that it is contemplated that various size fan means may be employed. In one instance, the rings 33 are of one diameter and in another instance, the rings 35 are a smaller diameter. It is to be understood that any suitable fan ring and fan arrangement and size may be employed.

Also, by reference to Figs. 2 and 3, it will be noted that the air heat exchangers 32 may be of different sizes and may be separate in order to provide for cooling of a plurality of plant products, intermediate products or other fluids to be cooled without co-mingling them.

The tower framework may be provided with the usual cat-walk 36 and ladder 37 to facilitate accessibility to the tower by workmen for repairs, operations and the like. Inasmuch as these do not constitute a part of this invention specifically, further discussion of this part of the system will be dispensed with in the interest of simplicity.

In operating the cooling system in accordance with this invention, the amount of water to be circulated through the cooling section 6 will be the minimum water requirement for cooling the plant for which the cooling system is designed for use. Primarily, this water usually will be employed solely for the cooling of certain equipment such as, for example, compressors, centrifugal pumps, and other equipment which is operated in conjunction with water jackets and require cooling at the location of their installations.

Section 8 of the system will be relied upon to supply the remainder of the cooling requirement for the plant. The fluid product and intermediate products to be cooled are passed through air heat exchangers 32, entering the exchangers through inlets 32a and leaving the exchangers through outlets 32b. These latter fittings, of course, are adapted to be connected to conduits leading to plant installations all of which are omitted from the drawings. The power means for causing a circulation of air or establishing a draft through the tower system includes the fans 9 which are adapted to be selectively rotated in such manner as to establish the flow of air through the system in either direction. In the installation shown, this is accomplished by changing the pitch on the fan blades, but of course, this could be accomplished by providing means for reversing the rotational direction or sense of the fans.

Assuming that the installation is operating during the summer months where the ambient air temperatures for a good portion of the time are in excess of 100° F. and it is desired to cool the fluids to be cooled to 100° F., it is obvious that this could not be accomplished in practical equipment by merely passing the ambient air through the exchangers 32. However, even higher air temperatures are common in many areas in the summer months and during such times, the water to be cooled, or at least a majority of it, will be introduced into the tower 6 through trough 15 and will flow downwardly over the water filming and breaking elements 38. The air during this time is drawn by the fans through the louvered opening entering the tower between adjacent louvers 13. The air passes substantially transversely through the downcoming flow of water in the tower and the intimate contact of the water and air results in a cooling of both the water and air. During such periods of high ambient air temperatures, best results are obtained by operating the system so that the ratio of air flow to water flow is high. This effects an inefficient cooling of the water for the air will be cooled lower than the water temperature. However, this is desirable in order to reduce the air temperature sufficiently below the temperature to which it is desired to cool the plant products and the like so that the cooled air in passing through the air heat exchangers 32 will readily reduce the temperature of the fluids passing through the exchangers to the desired low point. Usually, it is desirable that the temperature to be attained in the air heat exchangers be at least 20° F. greater than the temperature of the cooling air entering the exchangers. By operating the water system in an inefficient manner, the temperature of the air may be easily reduced below the requisite low temperature. The mist eliminator 7 separates the mist carried by the air leaving the water cooling section from the cool air. The advantage of this is two-fold, namely, to recover the water in this area of scarce water and also to prevent the water from contacting the air heat exchangers where it would be evaporated to deposit a scale upon the tubes and vanes of the exchangers reducing their efficiency. When operating without the mist eliminator sections 7, particularly in areas where the water carries large mineral content, it frequently will be necessary to remove the accumulated scale from the heat exchanger tubes and vanes in order to operate them efficiently unless the mist eliminator is used, and this is the primary reason for using the mist eliminator.

During periods of operation when the ambient air temperatures are not extremely high, a portion of the water may be circulated through tower 6, through header 17 and sprays 18. Three-way valve 19 is provided to facilitate the control of flow of water through conduit 16 and header 17 and as heretofore indicated is operated automatically in response to air temperatures at the heat sensitive device 41.

As the temperature of the ambient air reduces in cooler seasons of the year, the requirement for cooling of the air reduces in proportion. Also, the effect of the air on the water will be to more readily cool the water to the desired temperatures for the water.

In order to give an automatic operation to control the water cooling, a conduit or line 20 controlled by a motor operated valve 20a has been provided connected between conduit 16 and the sump 21 whereby when the valve 20a is open, a portion of the water to be cooled is bypassed directly into sump 21 without traversing any part of the cooling section 6 cooled by air. This hot liquid mixes with the cooled water collected in the sump 21, that has passed downwardly through tower section 6, so that the discharged water from the sump will reflect the resultant temperature of the mixture. Therefore, in accordance with this invention, the motor valve 20a is automatically controlled in response to the temperature of the water discharged from sump 21 by means of heat sensitive device 23, pilot control 46 and motor 39.

During the seasons when the ambient air temperatures are well below those required for operating exchangers 32, doors 34 may be opened whereby a large portion of the air supplied to the exchangers bypasses the water cooling section 6 entirely. These doors preferably are large enough to substantially supply the need of air for the exchangers 32. This reduces materially the quantity of air that is drawn through the water cooling section 6, but due to the reduced temperature of the air, this reduced draft will be sufficient to meet the requirements of the water cooling section.

During periods of operation when the air temperature is very low and particularly when well below the freezing point of water, it is desirable, in order to prevent freezing up of the water cooling section entirely, to reverse the flow of air through the system. This may be accomplished in any desired manner so that the air actually enters the tower through the fan rings 33 and 35 and then contacts the exchangers 32. This materially raises the temperature of the air discharged from the exchangers and this warmer air then is conducted by the interior of the tower through the water cooling section 6 leaving the tower framework through the louvered opening along the side of the water cooler section. If desired, the doors 34 may be opened during this operation to reduce the amount of air passing through the water cooler section 6 of the tower.

The advantage of the cooling system and method of this invention will be more readily appreciated by referring to a specific plant installation where it is desired to supply the complete cooling requirement for a gasoline plant. In this plant, it is necessary to cool the plant products and some intermediate products to a temperature of 100° F. and the equipment requirements for water cooling demand circulation of 1,500 gallons of water per minute.

In this plant were the complete cooling requirement to be provided by water, it would require circulation of 9,000 gallons per minute and inasmuch as the plant installation is in an arid country where water is scarce and expensive, water cooling is not economical in operation although the water cooling system from an investment standpoint would provide the least outlay for equipment. This same plant could have its cooling requirements met by a stage apparatus wherein air was relied upon to cool the products and intermediate products to as low a temperature as possible and then a secondary cooling is accomplished by the usual water cooling. However, such an installation would require circulation of 2,500 gallons of water per minute which is 1,000 gallons of water more than is required to cool the equipment such as compressors and the like which require cooling at their points of installation. In addition, from an investment standpoint, such stage cooling apparatus is somewhat more expensive to install than the apparatus in accordance with this invention.

For this same plant, the cooling requirement is met in accordance with this invention by circulating only 1,500 gallons of water per minute, which is the least water that can be used to cool the equipment and the like. The circulation of this amount of water through the cooling tower section 6 is sufficient to reduce the temperature of the air, even during the hot seasons, sufficiently that all of the cooling requirement, except for the equipment such as compressors and the like, is met by air heat exchangers.

Such an installation is also advantageous in extreme cold weather where the ambient air temperature is so low that the air may be used directly in the air heat exchangers and yet which would ordinarily cause trouble of icing in a water cooling section. The air flow, if necessary, may be reversed so as to warm the air prior to contact with the water.

Another advantage of installations in accordance with this invention is that in many plants it is necessary to pipe the water for compressor jackets and the like to equipment locations which may be as much as one or two thousand feet from the water cooler tower. By accomplishing as much cooling by air as possible, the expense of circulating water over large distances is greatly reduced.

It will be seen that the objects of this invention have been accomplished. There has been provided a system for meeting the cooling requirements of a plant such as a gasoline plant or the like wherein only the minimum amount of water required by the plant for cooling purposes is utilized and the remainder of the cooling requirement is supplied by air heat exchange coolers. The arrangement and method are such that the apparatus and method may be employed in areas of scarce water where seasonal temperature variations are very extreme. This combination of parts cooperates in the hot season to simultaneously cool the air to be used in the air exchangers while the water is being cooled by contact with the air. On the other hand, in the cold seasons of the year, the combination functions advantageously by providing for the warming of the air heat in the air exchangers prior to its contact with the water which otherwise would give rise to troubles connected with the freezing of the water within the tower.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a cooling system an enclosed tower framework with an air inlet and an air outlet with power means to provide an air draft therethrough, a water cooling system within the framework arranged so the water flows transversely to and in intimate contact with flow of air whereby both fluids are cooled, an air heat exchange cooler transverse the passage for air flow downstream of the water cooling system, and closures, providing part of the enclosure wall of the framework, movable between open and closed positions, said closures communicating with the passage between the water cooler system and air exchanger to admit air to the passage to bypass the water cooler system.

2. In a cooling system an elongate tower framework, wall openings arranged along one side of the framework, water filming and breaking packing supported by the framework adjacent the wall openings and extending substantially the length thereof, water distributing means supported by and within the framework above the packing, a plurality of air heat exchangers supported by the framework along the other side thereof, and fans mounted on the framework so as to create an air draft through the wall openings, the packing and thence, through the air heat exchangers.

3. The system of claim 2 wherein a wall section between the water packing and the exchangers is equipped with movable closures whereby air may be passed through the air heat exchangers bypassing the packing.

4. In a cooling system, a tower section for cooling water including an air passage and means for providing a well broken down flow of water substantially transversely thereof, an air heat exchanger section, duct means connected between the two sections for conducting air discharged from the water section to and through the air heat exchangers, and reversible power means adapted to create an air draft through the system with air entering the water cooling section and discharging from the air heat exchanger section or entering the air heat exchanger section and discharging from the water cooling section selectively.

5. In a cooling system, a tower section for cooling water including an air passage and means for providing a well broken down flow of water substantially transversely thereof, an air heat exchanger section, duct means connected between the two sections for conducting air discharged from the water section to and through the air heat exchangers, said duct means having openings to the exterior of the duct means between the two sections, movable closures for controlling flow through said openings whereby air may selectively by-pass the water section while passing through the air exchanger section, and power means adapted to create an air draft through the system with air entering the water cooling section and discharging from the air heat exchanger section.

6. In a cooling system, a tower section for cooling water including an air passage and means for providing a well broken down flow of water substantially transversely thereof, an air heat exchanger section, duct means connected between the two sections for conducting air discharged from the water section to and through the air heat exchangers, power means adapted to create an air draft through the system with air entering the water cooling section and discharging from the air heat exchanger section, and means for introducing water into the water cooling section at a plurality of levels therein, and means for selectively controlling the volume of flow of water to each of the levels.

7. In a cooling system, a tower section for cooling water including an air passage and means for providing a well broken down flow of water substantially transversely thereof, an air heat exchanger section, duct means connected between the two sections for conducting air discharged from the water section to and through the air heat exchangers, power means adapted to create an air draft through the system with air entering the water cooling section and discharging from the air heat exchanger section, means for distributing water within the water cooling section at a plurality of levels therein and means for selectively controlling the volume of water flow to each of the levels in response to the temperature of air intermediate the water cooling section and the air heat exchanger section.

8. In a cooling system, a tower section for cooling water including an air passage and means for providing a well broken down flow of water substantially transversely thereof, an air heat exchanger section, duct means connected between the two sections for conducting air discharged from the water section to and through the air heat exchangers, power means adapted to create an air draft through the system with air entering the water cooling section and discharging from the air heat exchanger section, and by-pass means for selectively passing a part of the water to be cooled directly into the water discharge from the cooling section.

9. In a cooling system, a tower section for cooling water including an air passage and means for providing a well broken down flow of water substantially transversely thereof, an air heat exchanger section, duct means connected between the two sections for conducting air discharged from the water section to and through the air heat exchangers, power means adapted to create an air draft through the system with air entering the water cooling section and discharging from the air heat exchanger section, by-pass means for selectively passing a part of the water to be cooled directly into the water discharge from the cooling section, and temperature sensitive means to control the by-pass for passing a part of the water to be cooled into the discharge water responsive to the temperature of the discharge water.

10. The method of supplying the cooling requirements for a plant comprising the steps of circulating cooling water through water heat exchangers to supply part of the cooling for the plant, cooling the hot water from the water heat exchangers of the plant by passing air through the water, recirculating the cooled water through the water heat exchangers and passing the air discharged from the cooling of the water through air heat exchangers to supply the remainder of the plant cooling requirement.

11. The method of supplying the cooling requirements for a plant comprising the steps of circulating cooling water through water heat exchangers to supply part of the cooling for the plant, cooling the hot water from the water heat exchangers of the plant by passing air through the water, recirculating the cooled water through the water heat exchangers eliminating the mist from the air discharged from the cooling of the water and then passing the air through air heat exchangers to supply the remainder of the plant cooling requirements.

12. The method of supplying the cooling requirements for a plant comprising the steps of circulating cooling water through water heat exchangers to supply part of the cooling for the plant, cooling the hot water from the water heat exchangers of the plant by passing air through the water, recirculating the cooled water through the water heat exchangers passing the air discharged from the cooling of the water through air heat exchangers to supply the remainder of the plant cooling requirement and maintaining the ratio of air flow to water flow so as to cool the air to a temperature below the temperature of the cooled water.

13. The method of supplying the cooling requirements for a plant comprising the steps of circulating cooling water through water heat exchangers to supply part of the cooling for the plant, cooling the hot water from the water heat exchangers of the plant by passing air through the water, recirculating the cooled water through the water heat exchangers passing the air discharged from the cooling of the water through air heat exchangers to supply the remainder of the plant cooling requirement and during times when the ambient air temperature is below the freezing point of the water to be cooled reversing the flow of air to first pass it through air heat exchangers and then pass the air discharged from the air heat exchangers through the water to be cooled.

14. The method of supplying the cooling requirements for a plant comprising the steps of circulating cooling water through water heat exchangers to supply part of the cooling for the plant, cooling the hot water from the water heat exchangers of the plant by passing air through the water, recirculating the cooled water through the water heat exchangers passing the air discharged from the cooling of the water through air heat exchangers to supply the remainder of the plant cooling requirement, maintaining the ratio of air flow to water flow so as to cool the air to a temperature below the temperature of the cooled water and regulating the water discharge temperature by passing a portion of the water into the water cooling tower at an intermediate layer or level in the tower.

15. The method of supplying the cooling requirements for a plant comprising the steps of circulating cooling water through water heat exchangers to supply part of the cooling for the plant, cooling the hot water from the water heat exchangers of the plant by passing air through the water, recirculating the cooled water through the water heat exchangers passing the air discharged from the cooling of the water through air heat exchangers to supply the remainder of the plant cooling requirement, maintaining the ratio of air flow to water flow so as to cool the air to a temperature below the temperature of the cooled water, and regulating the water temperature by passing a portion of the water to be cooled directly into the water discharged from the water cooler, the amount of by-passed water being dependent on the temperature of the water discharged from the water cooler.

16. The method of supplying the cooling requirements for a plant comprising the steps of circulating cooling water through water heat exchangers to supply part of the cooling for the plant, cooling the hot water from the water heat exchangers of the plant by passing air through the water, recirculating the cooled water through the water heat exchangers passing the air discharged from the cooling of the water through air heat exchangers to supply the remainder of the plant cooling requirement, and regulating the amount of air passed through the water in response to the temperature of the air discharged from the water cooling step.

NEAL B. LAUBACH.

REFERENCES CITED

The following references are of record in the file of this patent:

UNITED STATES PATENTS

| Number | Name | Date |
|---|---|---|
| 1,966,275 | Wright | July 10, 1934 |
| 1,968,778 | Caldwell | July 31, 1934 |
| 2,075,036 | Hollis | Mar. 30, 1937 |
| 2,187,398 | Goggins | Jan. 16, 1940 |
| 2,353,233 | Gygax | July 11, 1944 |
| 2,387,473 | Spitzka | Oct. 23, 1945 |
| 2,454,883 | Olstad | Nov. 30, 1948 |
| 2,480,286 | Collis | Aug. 30, 1949 |